Henry W. Adams and Steuben T. Bacon,
Steam Drying Appr.
No. 116531
PATENTED JUL. 4 1871
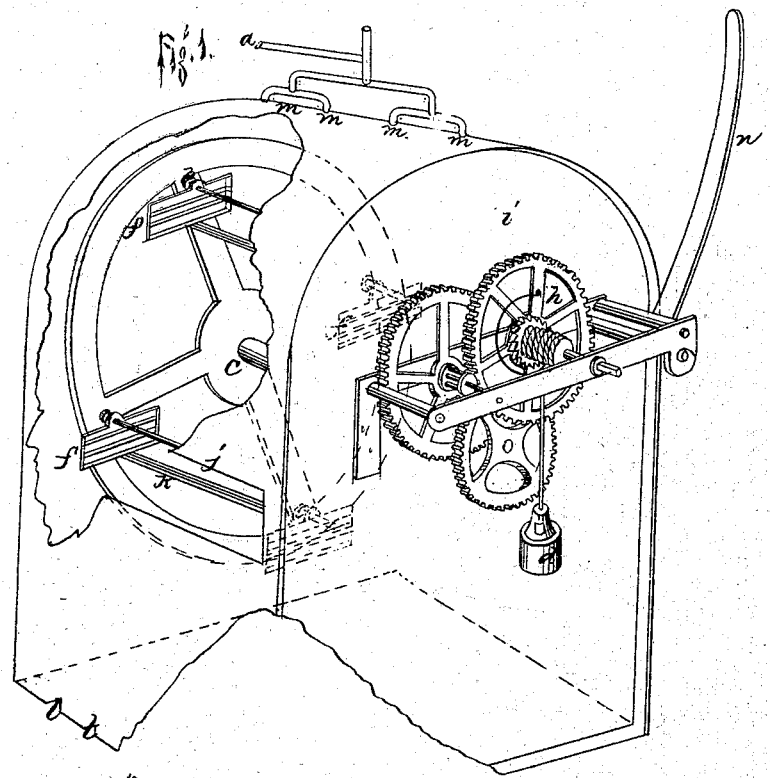
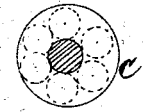
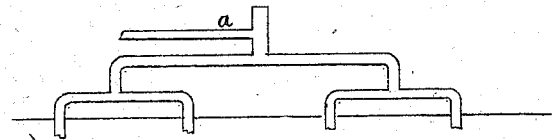
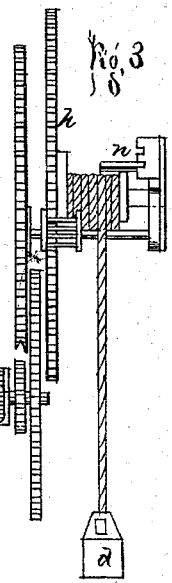
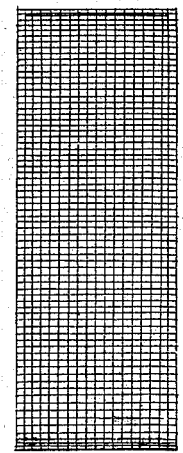
Witnesses,
Frank Stout
Robert Andrews
Inventors.
Henry W Adams M.D.
Steuben T Bacon

UNITED STATES PATENT OFFICE.

HENRY W. ADAMS, OF PHILADELPHIA, PENNSYLVANIA, AND STEUBEN T. BACON, OF BOSTON, MASSACHUSETTS; SAID ADAMS ASSIGNS HIS RIGHT TO SAID BACON.

IMPROVEMENT IN DRIERS.

Specification forming part of Letters Patent No. 116,531, dated July 4, 1871.

*To all whom it may concern:*

Be it known that we, HENRY W. ADAMS, M. D., of the city and county of Philadelphia and State of Pennsylvania, and STEUBEN T. BACON, of Boston, county of Suffolk and State of Massachusetts, have invented certain Improvements in Drying Apparatus, of which the following is a specification:

The first part of our invention relates to the method of subjecting the articles to be dried to a uniform current of dry air, for the purpose of drying each charge in an equable manner during the same period of time. The second part of our invention relates to the mode of producing a current of air through the apparatus.

Figure 1 is a perspective and sectional view of the apparatus. Fig. 2 represents suction-pipes, through which the air passing through the apparatus is discharged into the atmosphere by means of the steam-jet escaping from $a$. Fig. 3 represents the pulling-weight, by which the reel $b$ is rotated. Fig. 4 represents the friction-rollers, within which the shaft $c$ rotates for the purpose of enabling a light weight, $d$, to rotate the reel $b$. Fig. 5 represents perforated trays for holding the articles to be dried.

$b$ represents the reel. $f$ shows the swinging supports of the trays $g$, in which the articles to be dried are to be placed. $h$ represents gearing attached to the shaft $c$, which is operated by the weight $d$. $i$ represents the inclosure of the reel $b$. $j$ represents the door, through which the trays charged with the article to be dried are placed on the swinging supports $f$. $k$ represents an open frame to support the trays. $l\ l$ represent openings in the bottom of the inclosure $i$ to admit air into the apparatus. The inclosure $i$ has no bottom. $m\ m\ m\ m$ represent escape-pipes attached to the top of the inclosure $i$.

The operation of our improved steam-drying apparatus is as follows: The trays $g$ are charged with the articles to be dried and introduced through the door $j$, and placed on the swinging supports $f$ and the open frames $k$. The door $j$ is then closed. The weight is now wound up. The brake $n$ is adjusted to allow the gearing $h$ to move at any desired speed and rotate the reel $b$. Steam is now turned on from a generator to the pipe $a$, which causes air to rush in through the openings $l\ l$ in the lower part of the inclosure $i$ and pass up in a current through the apparatus in contact with the articles to be dried, absorb the moisture in them, and escape through the openings $m\ m\ m\ m$ into the atmosphere. The revolution of the reel $b$ causes the charge to pass continuously through the same quantity and quality of air, and to be dried uniformly in all parts of the apparatus. The rotation of the reel mixes the air more thoroughly with the charge and hastens the drying.

What we claim as our invention is—

1. In the apparatus above described, the open frames $k$ and reel $b$, in combination with the supports $f$, substantially in the manner and for the purposes represented.

2. In the apparatus above described, the bottomless inclosure $i$ with the escape-pipes $m\ m\ m\ m$, in combination with reel $b$, substantially in the manner and for the purpose shown and described.

3. In the apparatus above described, the escape-pipes $m\ m\ m\ m$, in combination with the inclosure $i$, substantially in the manner and for the purposes described.

4. In the apparatus above described, the steam-pipe $a$, in combination with the escape-pipes $m\ m\ m\ m$ and the inclosure $i$, substantially in the manner and for the purposes set forth.

5. In the apparatus above described, the perforated trays $g$, in combination with the steam-pipe $a$, escape-pipes $m\ m\ m\ m$, and reel $b$, substantially in the manner and for the purposes shown and described.

HENRY W. ADAMS, M. D.
STEUBEN T. BACON.

Witnesses:
FRANK STOUT,
JOSEPH EVANS.